May 27, 1969     F. A. STRAUB     3,445,908
METHOD OF MAKING BEARING MEMBER
Filed Aug. 2, 1966
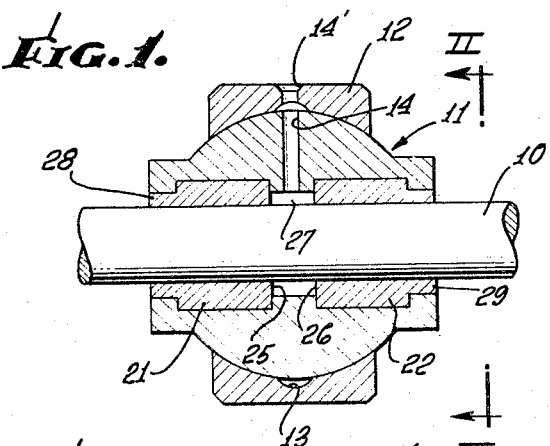
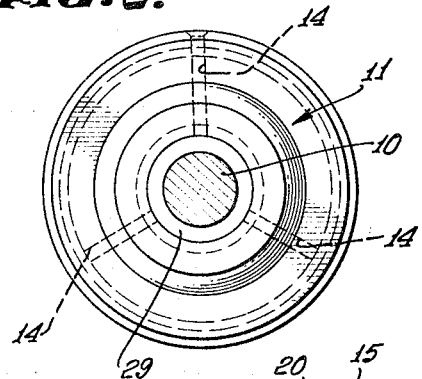
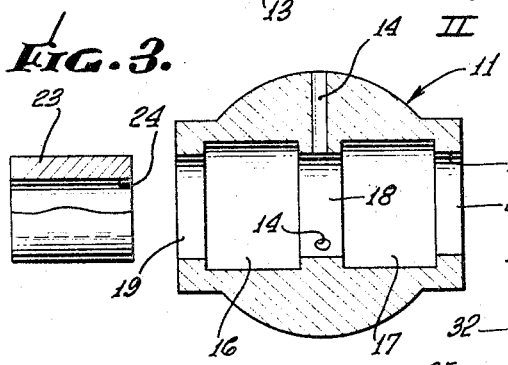
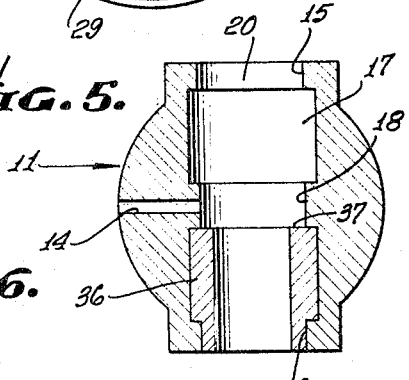
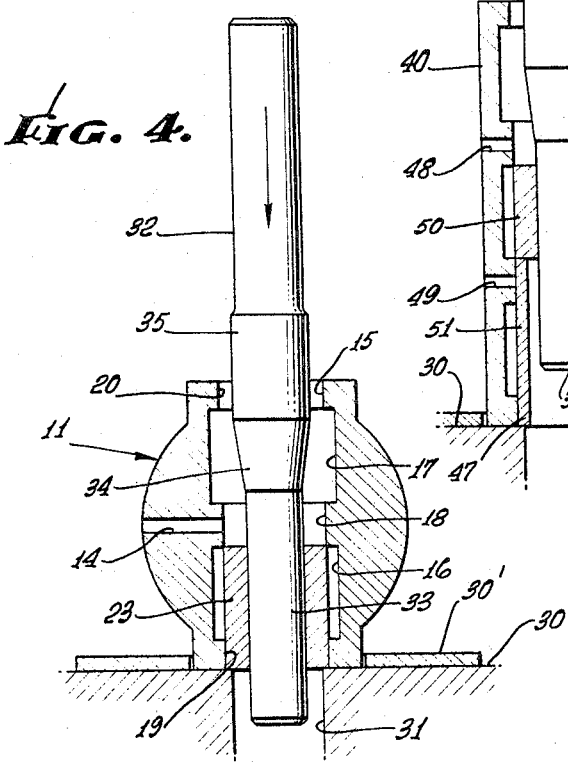
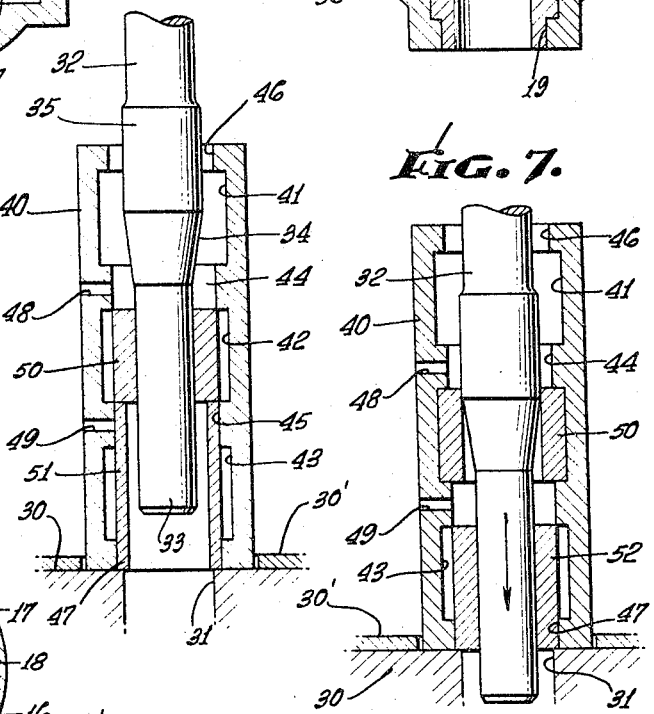
INVENTOR.
FREDERICK A. STRAUB
BY
Miketta, Glenny, Poms & Smith
ATTORNEYS.

United States Patent Office 3,445,908
Patented May 27, 1969

3,445,908
METHOD OF MAKING BEARING MEMBER
Frederick A. Straub, 4222 Los Nietos Drive,
Los Angeles, Calif. 90027
Filed Aug. 2, 1966, Ser. No. 569,674
Int. Cl. B21d *53/10;* F16c *13/02, 33/00*
U.S. Cl. 29—149.5                                4 Claims

ABSTRACT OF THE DISCLOSURE

A method providing an inner bearing surface in a bearing member, which may be employed as the inner member of sleeve or spherical type bearings, by plastically expanding bearing material inserts into a shallow annular recess within the bearing member bore so as to temporarily expand the bearing member within its elastic limit so as to permanently deform the bearing material insert and relieving the expansion force so that the bearing member may spring back tightly around the permanently expanded insert.

---

It has been common practice heretofore to provide a one-piece continuous bearing liner or bushing within bearing members to provide suitable bearing surfaces therein. Such bearing members have internal recesses or oil grooves communicating by radial passages with the exterior to allow injection of lubricant from outside the bearing member to the oil groove. However, when a bearing material liner has been provided, the bearing material liner tends to fill and interrupt the oil groove preventing the passage of lubricant to the bearing surfaces provided by the liner. Heretofore, such lubricant passages have been opened by drilling through the inserted bearing sleeve, liner or bushing by running a drill down through the radial lubricant passages through the bearing member. This operation frequently has caused chips of bearing liner material to be trapped within the bearing member oil groove surrounding the liner interfering with the passage of lubricant therethrough. Further, these prior one-piece bearing material liners or sleeves have tended to rotate within the bearing member causing the lubricant holes drilled therethrough to rotate relative to the radial lubricant passages in the bearing member and prevent a continuous uninterrupted supply of lubricant through the bearing member and liner to the internal bearing surfaces.

It is therefore a principal object of the present invento disclose a bearing member construction and method of making the same wherein an internal, continuous annular lubricant-receiving chamber is formed between the bearing member body and an inner member or shaft upon which said bearing member is mounted which is not interrupted by chips of liner material nor affected by inadvertant movement of bearing liners.

It is another object of the present invention to disclose and provide a method of making a bearing member as in the foregoing object wherein such lubricant-receiving chamber is concurrently formed with the novel provision of spaced bearing material inserts plastically deformed into tight non-shiftable relation within the bearing member.

It is also an object of the present invention to disclose and provide a method of making a bearing member as in the foregoing objects wherein the bearing material inserts or bushings tightly fitted within the bearing member are plastically deformed into spaced annular enlarged diameter bore or recess portions within the bearing member and wherein the bearing member is temporarily expanded elastically within its elastic limit during provision of the inserts therein to obtain a very tight frictional fit between the bearing member and inner bearing bushings or inserts due to the spring-back or memory of the bearing member in attempting to resume its original non-expanded condition.

It is still a further object of the present invention to disclose a method of providing the bore of an inner bearing of a spherical or sleeve bearing with an internal, annular lubricant-receiving passage communicating with radial passages extending to the outer bearing surfaces in a novel manner by plastically deforming bearing material bushings, inserts or sleeves into selected locations within such a bearing member and in such a manner so as to provide an annular channel therebetween with inner portions of the bearing member, such bore portions being intersected by lubricant passage means to facilitate the introduction of lubricant into such passage and to the inner bearing surfaces of such bushings, inserts or sleeves.

It is a still further object of the present invention to disclose and provide a method of making bearing member to be rotatably mounted upon an inner member, wherein a plurality of bearing material inserts are plastically deformed into a plurality of enlarged diameter portions within the bearing member bore in such manner to concurrently and consequently form an internal, continuous annular lubricant-receiving chamber formed between the bearing member body and the inner member when such bearing member is rotably mounted upon the inner member.

It is also an object of the present invention to disclose and provide the method of the preceding object wherein the bearing member is an inner race of a spherical bearing to be mounted upon a shaft, the bearing member is provided with a pair of relatively shallow recesses separated by an inner bore portion communicating with a lubricant passage and the inner race is provided with internal stresses forcing it into a tight frictional fit with such inserts.

It is also an object of the present invention to disclose and provide a method of making a hearing member wherein a bearing insert, bushing or sleeve of relatively thin wall construction is plastically deformed into a shallow groove within the bearing member, the wall thickness of such inserts, bushings or sleeves being only between about 0.030 inch and 0.060 inch.

Another object of the present invention is to disclose and provide a method of making a bearing member as in the foregoing object wherein at least portions of the bearing member are held in elastically deformed expanded state by forces exerted thereon by bearing material inserts plastically deformed into a permanent set therein, a very tight non-rotative relationship between such inserts and bearing member being thereby effected.

These and various other objects as well as various advantages and the method of making a bearing member will become apparent to those skilled in the art from a consideration of the following detailed description of exemplary embodiments thereof. Reference will be made to the appended sheet of drawings in which:

FIG. 1 is a cross-sectional view of an exemplary embodiment of the bearing member according to the present invention employed in a self-aligning, spherical bearing;

FIG. 2 is a side elevation of the exemplary embodiment of FIG. 1;

FIG. 3 is a cross-sectional detailed view of the bearing member of FIG. 1 prior to insertion of the bearing material inserts in accordance with the method of the present invention;

FIG. 4 is a sectional view of the bearing member of FIG. 3 with a bearing material insert positioned within the bearing member bore preparatory to deforming the insert into the bearing member bore recess in accordance with the method of the present invention;

FIG. 5 is a sectional view of the bearing member of FIG. 4 after the bearing material insert has been deformed into the bearing member bore recess;

FIG. 6 is a cross-sectional view of an alternative exemplary embodiment of bearing member showing the positioning of a bearing material insert within the bearing member preparatory to its deformation into a recess within the bearing member in accordance with the method of the present invention; and FIG. 7 is a cross-sectional view of the alternative exemplary embodiment of bearing member of FIG. 6 showing the positioning of a bearing material insert within the bearing member bore prior to its being deformed into the aligned bore recess in accordance with the method of the present invention.

The bearing member in accordance with the construction and method of the present invention may be employed in various types of bearings. As shown in FIGS. 1 through 5, the bearing member of the present invention may be employed as the inner race of a self-aligning spherical bearing which is to be rotatably mounted on another inner member or shaft 10.

In the exemplary spherical bearing of FIG. 1, an inner race or ball 11 is rotatably mounted within an outer race 12 which is formed about the ball 11 in a manner apparent to those skilled in the art. The inner race or ball 11 is preferably made of a heat-treated alloy steel with its outer surfaces, particularly the spherical outer surfaces, hard chromium plated. The outer race 12 may be made of aluminum bronze or alloy steel. The inner race or ball 11 in this exemplary self-aligning spherical bearing is also rotatably mounted about the shaft 10, the bearing member 11 thus being rotatable relative to both shaft 10 and race 12.

Race 12 may be provided with an internal annular recess or groove 13 for distributing lubricant to lubricant passages 14 provided in the bearing member 11. A plurality of such lubricant passages 14 may be provided in the bearing member, as best seen in FIG. 2, extending radially outwardly of the inner bore of bearing member 11 and communicating between the bore and bearing member exterior. Lubricant, such as grease or oil, may be thus introduced into the bearing member 11 bore by injecting such lubricant through an inlet 14' of the race 12, distributing it about the bearing member through the race groove 13 and then passing the lubricant through the radial lubricant passages 14 of the bearing member 11.

In accordance with the present invention, and as seen in FIG. 3, the bearing member is provided with a plurality of enlarged diameter portions within the body bore 15. In the exemplary embodiment of FIGS. 1 through 5, such plurality of enlarged diameter portions form a pair of relatively shallow annular recesses 16 and 17 positioned on opposite sides of the lubricant passage 14. The depth of these relatively shallow grooves or recesses 16 and 17 is preferably on the order of about 0.005 to .010 inch.

By spacing the shallow annular recesses 16 and 17 on opposite sides of the lubricant passage 14, an inner bore portion 18 is provided between the recesses which is intersected by the lubricant passages 14. This inner bore portion 18 may be considered as a flange or projection relative to the adjacent recesses 16 and 17.

The annular shallow recesses or enlarged diameter bore portions 16 and 17 preferably do not extend outwardly of the bearing member to its outer ends. As shown in FIG. 3, the recesses 16 and 17 are spaced inwardly of the outer bearing member ends providing outer bore flanges or outer bore portions 19 and 20. The bore portions 18, 19, and 20 cooperate with the recesses 16 and 17 to retain bearing inserts deformed into the recesses against longitudinal shifting movement within the bearing member as hereinafter described.

A plurality of bearing material inserts are provided within the bearing member 11 of the exemplary embodiments of FIGS. 1 through 5 to rotatably mount the bearing upon shaft 10 in rotatable bearing relationship. In the exemplary embodiment of FIGS. 1 through 5, such plurality of soft bearing material inserts include the pair of inserts 21 and 22 as best seen in FIG. 1. Such bearing material inserts may be made of aluminum bronze, silicon bronze, manganese bronze or other suitable bearing material. The inserts are preferably machined to a preformed generally cylindrical shape, as insert 23 in FIG. 3, and are very tightly and firmly secured within the bearing member internal annular shallow recesses in accordance with the method of the present invention as hereinafter described. Each preformed bearing material isert 23 is provided with a center bore 24 of smaller diameter than the bearing member body bore 15 to act as the bearing surfaces as seen in FIG. 1 when the bearing member with the bearing inserts is mounted upon the inner member or shaft 10. As stated previously, the relatively shallow bore recesses 16 and 17 are preferably about 0.005 inch deep. For reasons as hereinafter explained, each bearing material insert 23 is preferably provided with a wall thickness of about 0.030. The insert wall thickness may of course vary including much thicker wall sections, but I have found that the insert thickness to best achieve the advantages of the method of the present invention, should be about 0.030 and may vary up to around 0.060 inch.

The bearing member according to the present invention is provided with internal, continuous annular lubricant-receiving channel means formed within the bearing member body by the novel provision of bearing material inserts spaced on either side of an inner bore portion intersected by a lubricant passage through the bearing member. It is further contemplated that upon the mounting of the bearing member upon an inner member, as shaft 10 in FIG. 1, that the annular lubricant-receiving channel is enclosed forming an internal, continuous annular lubricant-receiving chamber formed between the bearing member body and such inner member. In the exemplary embodiment of FIGS. 1 through 5, it may be seen that such lubricant-receiving channel is formed by the inner bore portion 18, intersected by radial lubricant passage 14, and the inner edges 25 and 26 of the bearing material inserts 21 and 22. Because the bearing material inserts 23 are provided with a wall thickness greater than the depth of the shallow annular recesses 16 and 17, the inner edges 25 and 26 of the inserts 21 and 22 extend outwardly of the recesses and radially inwardly of the body bore 15 defining opposed walls adjacent the inner bore portion 18.

Upon the assembly of the bearing member 11 with the internal bearing material inserts 21 and 22 upon an inner member, such as shaft 10 in FIG. 1, an internal, continuous annular lubricant-receiving chamber 27 is formed between the bearing member body and the inner member upon which it is rotatably mounted. Chamber 27 is thus in communication with and adjacent the inner bearing surfaces of the bearing member provided by the insert bore surfaces bearing upon the inner member, as shaft 10 in FIG. 1. These inner bearing surfaces, between the inserts 21, 22 and the inner shaft 10, are thus continuously exposed to lubricant provided within the chamber 27 about the interior of the bearing member. The chamber 27 is free of any irregularities or obstructions. It cannot be inadvertently closed or reduced in size by movement of the bearing material inserts, which are held against lateral movement within the bearing by the shallow-spaced recesses 16 and 17. As described hereinafter, the bearing inserts are tightly held against rotation within the bearing member and are preferably provided within the bearing member so that, as seen in FIG. 1, integral portions 28 and 29 of the inserts 21 and 22 project laterally of the recesses and overlie the bearing member outer bore portions 19 and 20. This provides bearing surfaces to the extremities or outer edges of the bearing member, forms a single internal annular lubricant-receiving chamber communicating with the radial lubricant passages of the bearing member and securely holds the bearing inserts against lateral movement tending to interrupt or reduce the lubricant-supplying function of the chamber 27 when the bearing member is being operated under heavy loading or impact loading.

The method of providing a bearing member with an uninterrupted internal, annular lubricant-receiving passage means communicating with internal bearing surfaces, according to the present invention, will now be explained in detail with reference to the making of the exemplary bearing member 11 employed in the exemplary self-aligning spherical bearing of FIGS. 1 through 3. Referring to FIG. 4, the exemplary bearing member 11, the inner race or ball member of the exemplary spherical bearing of FIG. 1 in this exemplary embodiment, is provided with an inner bore 15 which can be accomplished by drilling or boring operations in conventional manner. Similarly, a lubricant supply passage 14 may be provided radially through the bearing member by drilling as many passages as desired, there being three in the preferred embodiment, as seen in FIG. 2. A plurality of shallow annular recesses, a pair of recesses 16 and 17 in exemplary embodiment, are provided with at least one inner bore portion (bore portion 18) between recesses and bore outer end marginal portions (outer flanges or bore portions 19 and 20) outwardly of the recesses. The inner bore portion according to the present method must be intersected by at least one lubricant supply passage.

The bearing material inserts may be preformed into a plurality of generally cylindrical inserts with a wall thickness, as previously described, greater than the depth of the shallow recesses. I have found that very thin liners having a wall thickness of between about 0.030 and about 0.060 inch may be employed successfully within the bearing member wherein the depth of the body bore annular recesses is about 0.005 inch.

In order to ultimately provide an internal uninterrupted annular lubricant-receiving passage within the bearing member, according to the present method, the bearing inserts must have a wall thickness sufficiently great so that the inner diameter of the inserts is smaller than the bearing member bore after insertion of the inserts into the body bore recesses. The outside diameter of the inserts should be smaller than the bearing member body bore diameter to allow ease of insertion of the inserts into the body bore prior to deforming them into the recesses as hereinafter explained. Further, the preferred length of each insert is at least approximately equal to the width of the recesses, to facilitate filling the recesses, and in the exemplary embodiment, is of a length equal to the sum of the width of a recess 16 or 17 and the adjacent outer bore portion or flange 19 or 20.

As seen in FIG. 4, according to the present method, the bearing member body 11 may be placed upon a table or fixed support 30 positioned in a fixture 30' to receive an expansion tool 32 through its bore 15, the tool passing partly down through table 30 into a well or opening 31 in the table. Opening 31 is sized to support a preformed bearing material insert 23, which is merely dropped into the body bore, as well as the bearing member body 11. The bearing member body is first positioned on one end over the opening 31 and a first insert 23 is dropped through the bore into position on table 30 aligned to the recess 16. The preferred length for the insert 23, as seen in FIG. 4, is equal to the sum of the width of recess 16 and the outer bore flange or outer bore portion 19. The expansion tool 32 is then lowered with a lower guide portion 33 entering the bushing or insert 23 to align it and the body 11 to the frusto-conical expansion surface 34 and expansion body portion 35 of the tool. Upon pushing of the expansion arbor or tool 32 through the bushing or insert 23, the soft bearing material insert is expanded and plastically deformed, the bearing material elastic limit being exceeded, into the recess 16 and overlying the bore end portion or flange 19, as best seen in FIG. 5. The deformed bearing material insert 36 (FIG. 5) may be rebored after being deformed into engagement with the bearing member bore recess and outer bore portion to provide a close tolerance fit upon the inner member, as shaft 10 in FIG. 1.

By the proper selection of recess depth, insert wall thickness and insert length, as above described, the bearing material insert 23 of FIG. 4 may be plastically deformed partly into and completely filling the aligned recesss 16 as shown in FIG. 5. I have found that the cold metal flow during such deformation by expansion of the bearing insert forces the inner end 37 of the insert 36 into tight engagement with the recess edge adjacent the inner bore portion 18. It is this inner edge 37 which cooperates with the inner bore portion 18 and the inner edge of a similarly provided insert in the spaced recess 17 which, according to the present invention, provides a continuous annular lubricant-receiving passage within the bearing member. Further, the complete filling of the recess 16 by the bearing insert material with portions overlying the bore outer portions or flange 19 provides a tight fit wherein lateral movement of the insert within the bearing bore is entirely eliminated.

The expansion arbor for expansion tool 32 may be merely withdrawn through the deformed liner, bushing or insert 36 after it has been deformed within the bearing member recess or it can be pushed entirely through and removed through the bottom of the table. I have found it is more convenient to merely raise the expansion tool back up through the relatively soft easily deformable bearing material of the inserts or bushings 36. To complete the method, a second bushing is dropped into the bearing member body 11 generally adjacent the recess 17 and the member 11 is turned over and placed upon the table 30 over the table opening 31 beneath the expansion tool or arbor 32. The prior operation described is then repeated, just as shown in FIGS. 4 and 5 with the exception that the deformed bushing 36 is in the upper portion of the inverted bearing member body 11 and the expansion tool passes once more through the prior deformed bushing 36 and then through the added bushing or insert, as 23 in FIG. 4, to deform the second insert into the second recess 17 and overlying the second outer bore flange 20.

One of the advantages of the bearing construction and method of the present invention is that bearing material liners, bushings or inserts of relatively small thickness may be employed even though the bearing is to be subjected to heavy loading and even impact loading. Such thin-walled liners, on the order of 0.030 to 0.060 inch may be employed in the present bearing member because the construction and method of the present invention provide a very tightly-fitting insert within the bearing member which does not rotate within the recesses nor shift laterally therein. The bearing material inserts or bushings 21 and 22 of the exemplary embodiment are prevented from rotating within the bearing member 11 during relative rotation between it and the inner member or shaft 10 because of a very tight frictional or compressive fit achieved by the method of inserting the bushings or liners into the bearing member according to the present method, as hereinafter more fully explained.

I have found that in passing the expansion tool 32 through the bearing material inserts or bushings, as 23 in FIG. 4, to deform them into the bearing member bore recesses, that a very tight non-rotative fit of the inserts or bushings within the bore recesses can be attained by temporarily expanding the bearing member within its elastic limit during the deforming of the inserts and relieving such temporary elastic deformation only after the inserts have achieved a permanent set in expanded condition. By selecting an expansion tool of sufficient size to not only expand and deform the bearing material inserts into the bearing member recesses, but also to cause an expansion of the bearing member of ball 11 of FIG. 4 of approximately 0.001 to 0.003 inch temporarily during the plastic deformation of the liner, I have found that upon withdrawal of the expansion tool the bearing member or ball 11 springs back and tightly grasps and compresses around the deformed bushing or insert. The expansion of the bearing member elastically is accomplished temporarily only while the expansion tool is passed through the bushing or insert 23 of FIG. 4. However, the bushing achieves a permanent set from its plastic deformation during the passage of the tool therethrough and does not have springback or elastic recovery to its original condition as does the heat-treated alloy steel bearing member 11. Such spring-back or elastic recovery or memory of the bearing member 11 tightly holds the bushings or inserts therein, the forces generated therebetween causing high frictional forces between the inserts and bearing member preventing rotation of the inserter bushing therein.

An alternative exemplary embodiment of bearing method with generally the same method of providing the inserts therein is shown in FIGS. 6 and 7. In this alternative exemplary embodiment, a sleeve bearing member 40, preferably of a suitable heat-treated alloy steel, is provided with a plurality of internal annular recesses 41, 42 and 43. Inner bore portions or inner bore flanges 44 and 45 are provided between the recesses and outer bore portions or outer bore flanges 46 and 47 are provided outwardly of the internal recesses. Lubricant passages 48 and 49 are provided extending radially between the bearing member bore and its exterior. The construction and method of making this alternative exemplary embodiment is similar to that of FIGS. 1 through 5 except that three internal recesses are provided in the sleeve-type bearing member whereas only two internal recesses were provided in the spherical bearing-type bearing member of FIGS. 1 through 5.

As seen in FIG. 6, the bearing member 40 may be placed on its end on table 30 within fixture 30' and over the opening or well 31 positioned to receive the expansion tool or arbor 32 therethrough. Means are provided for positioning a centrally disposed preformed bearing insert 50 adjacent the recess 42. As shown in FIG. 6, such means may include the provision of a positioning thin-walled cylinder 51 seated upon the table 30 and mounting the preformed bearing material insert 50 adjacent recess 42. Cylinder 51 must have an internal diameter greater than the outside diameter of the expansion tool 32 to prevent interference with the expansion operation. Upon pushing of the expansion tool 32 down through the bearing insert 50, the insert 50 is plastically deformed into the recess 42 with portions extending outwardly of the recess radially inwardly of the bearing bore as shown in FIG. 7. Thereafter, the outer recesses 41 and 43 may be provided with bearing material inserts in accordance with the method as previously described herein with regard to the exemplary embodiments of FIGS. 1 through 5, particularly FIG. 4. While the bearing insert 50 was approximately the same length as the recess 42, the insert 52 to be plastically deformed into recess 34 and over the outer bore flange 47 is longer, being approximately the same length as the sum of the width of recess 43 and flange 47. The expansion tool is merely run through the previously plastically deformed central bushing or insert 50 down through insert 52 to plastically deform it into the outer recess 43 as shown in FIG. 7. The bearing member 40 may then receive a third bearing bushing or insert in the bore, be turned over on the table 30 and the expansion tool or arbor run down through the prior bushing inserts 52 and 50 and therethrough expanding and permanently deforming such third bearing insert into the bearing member internal recess 41 to complete this alternative exemplary embodiment of sleeve-type bearing member.

The alternative exemplary bearing member 40 may be employed as a sleeve bearing member around an internal member, such as a shaft as in FIG. 1, and may also be the inner race of a surrounding sleeve-type race. The bearing member of the present invention is thus not limited to only use in sleeve or spherical-type bearings but can be employed as the bearing member in any bearing wherein it is desired to provide an internal annular lubricant-receiving passage which is not susceptible of being interrupted or closed due to movement of internal bearing surface materials within the bearing.

While the present bearing constructions and the method of making same have been described with the passage of an expansion tool or arbor therethrough, other means of expanding the bearing inserts into the bearing member recesses may be employed within the scope of the present invention, as for example by using a ball or other form of expansion tool to expand, swage or otherwise plastically deform the inserters partly in and filling the internal annular bearing member bore recesses as hereinbefore described. The foregoing detailed descriptions have been meant to be exemplary in nature of the bearing member construction and method of making same according to the present invention. It should be noted that other embodiments of the bearing member and various modifications, alternations and innovations thereof may be made which may come within the scope of the present invention which is defined by and limited only by the following claims.

I claim:

1. A method of making a bearing member to rotatably receive an inner member characterized by the provision of a plurality of bearing material inserts tightly retained therein with uninterrupted internal, annular lubricant receiving passage means communicating with internal bearing surfaces comprising the steps of:

providing a bearing member with an internal bore and a lubricant supply passage between the member exterior and said bore;

forming a plurality of shallow annular recesses within said inner bore with at least one inner bore portion between recesses and bore outer end marginal portions outwardly of the recesses, said inner bore portion being intersected by said lubricant supply passage;

preforming a plurality of generally cylindrical bearing material inserts having a wall thickness greater than the depth of said shallow recesses, an outside diameter smaller than the bearing member bore diameter and a length at least approximately equal to the width of said recesses; and forming an uninterrupted internal, annular lubricant receiving passage means within said bearing member bore in communication with inner bearing surfaces concurrently with the provision of such internal bearing surfaces by expanding and permanently deforming said inserts into each of said recesses by passing an expansion tool through each insert when it is aligned to a recess exceeding the insert material elastic limit to tightly fill each recess with portions of the associated insert, each insert having portions extending out of said recesses radially inwardly of said bore, and thereby forming a lubricant receiving passage between inserts adjacent said inner bore portion.

2. The method of claim 1 including the steps of:

preforming at least two of said inserts with a length substantially equal to the combined width of one of said recesses and one of said bore outer end marginal portions, and expanding and deforming said two of said inserts into recesses adjacent said marginal portions and over said marginal portions.

3. The method of providing the bore of an inner bearing with an internal, annular lubricating-receiving passage communicating with radial passages extending to the outer bearing surface, which method comprises:

forming the bore with shallow annular recesses on opposite sides of said radial passages whereby the bore is internally provided with an inner flange through which said radial passages extend and with flanges at the ends of the bore;

thereafter inserting in the bore a first bushing extending from one end of the bore to said inner flange and forcing a swaging tool through said first bushing in the direction of said one end of the bearing and thereby plastically expanding the bushing so as to be fitted tightly in said recess and to abut one side of said inner flange; and thereafter inserting in the bore a second bushing extending from said inner flange to the other end of the bearing and forcing said swaging tool through the second bushing and thereby expanding the latter so as to be fitted tightly in the second recess and to abut the opposite side of the inner flange, said bushings and inner flange forming an internal, annular lubricant-receiving passage.

4. The method of providing a bearing member bore with an inner surface of bearing material comprising the steps of:

forming a shallow annular recess within the bearing member bore;

preforming bearing material into a generally cylindrical insert having a wall thickness greater than the depth of said recess and an outside diameter smaller than the inside diameter of said bore;

positioning and maintaining said insert within said bore aligned to said recess;

plastically expanding said insert by applying radially outwardly directed forces against inner surfaces of said cylindrical insert to permanently deform it into an expanded, recess filling, tight engagement with said bearing member;

temporarily expanding said bearing member within its elastic limit by the expansion of said cylindrical insert therein during application of outwardly directed forces against the inner surfaces of the cylindrical insert; and relieving said cylindrical insert of said outwardly directed forces after the insert has been given the permanent set to an expanded state and allowing the bearing member to spring back tightly around the expanded insert providing said bearing member with a bearing material inner surface within said bore.

References Cited

UNITED STATES PATENTS

| | | | |
|---|---|---|---|
| 2,337,247 | 12/1943 | Kepler | 29—446 |
| 2,536,821 | 1/1951 | Rappl | 29—149.5 |
| 2,804,679 | 9/1957 | Tracy. | |
| 2,903,309 | 9/1959 | Brand | 29—523 |
| 3,221,391 | 12/1965 | Heim. | |

THOMAS H. EAGER, *Primary Examiner.*

U.S. Cl. X.R.

29—446, 523; 308—72, 78